United States Patent
Paucker et al.

(10) Patent No.: US 7,500,798 B2
(45) Date of Patent: Mar. 10, 2009

(54) PRINTER

(75) Inventors: Juergen Paucker, Villingen-Schwenningen (DE); Thomas Riester, Villingen-Schwenningen (DE); Torsten Wahler, Bad Duerrheim (DE)

(73) Assignee: Siemens Aktiengesellschaft, Munich (DE)

( * ) Notice: Subject to any disclaimer, the term of this patent is extended or adjusted under 35 U.S.C. 154(b) by 384 days.

(21) Appl. No.: 10/552,823

(22) PCT Filed: Mar. 10, 2005

(86) PCT No.: PCT/EP2005/051066
§ 371 (c)(1),
(2), (4) Date: Oct. 7, 2005

(87) PCT Pub. No.: WO2005/090087
PCT Pub. Date: Sep. 29, 2005

(65) Prior Publication Data
US 2006/0182483 A1    Aug. 17, 2006

(30) Foreign Application Priority Data
Mar. 19, 2004   (DE) ..................... 10 2004 013 963

(51) Int. Cl.
*B41J 11/00*   (2006.01)
(52) U.S. Cl. ..................... 400/613; 400/642
(58) Field of Classification Search .............. 346/18; 347/104; 400/613, 642
See application file for complete search history.

(56) References Cited

U.S. PATENT DOCUMENTS 4,465,390 A * 8/1984 Zander .................. 400/689
5,713,674 A * 2/1998 Nakayama et al. ........... 400/55
6,266,500 B1 * 7/2001 Numagami et al. ......... 399/104
6,437,815 B1 * 8/2002 Burkart ................... 347/222
2001/0032900 A1 * 10/2001 Buschulte et al. .......... 242/170

FOREIGN PATENT DOCUMENTS

| DE | 27 06 209 A1 | 7/1978 |
| DE | 32 27 833 A1 | 1/1984 |
| EP | 1 037 161 A2 | 9/2000 |

(Continued)

OTHER PUBLICATIONS

Derwent Abstract—DE 27 06 209 A1 Jul. 17, 1978 Siemens AG.

(Continued)

*Primary Examiner*—Anthony H. Nguyen
(74) *Attorney, Agent, or Firm*—Cohen Pontani Lieberman & Pavane LLP (57) ABSTRACT

A printer with an elongated media output port is disclosed. The printer may be used for a digital tachograph of a motor vehicle. The printer includes at least one bearing surface which limits the media output in the transverse direction and along which the printing medium slides during output. The boundary conditions for the operation of a small-format printer in a digital tachograph of a motor vehicle makes it necessary that the media output port has to be sealed off against the ingress of harmful media. Therefore, the media output port includes an elongate sealing closure which is movable in the transverse direction and presses elastically against the bearing surface by a sealing feed guide. The printing medium is capable of being outputted between the bearing surface and the sealing closure in an output direction.

19 Claims, 8 Drawing Sheets

FOREIGN PATENT DOCUMENTS

| | | |
|---|---|---|
| EP | 1 103 927 A2 | 5/2001 |
| GB | 2 206 537 A | 1/1989 |

OTHER PUBLICATIONS

Derwent Abstract—DE 32 27 833 A1 Jan. 26, 1984 Nixdorf Computer AG.

Derwent Abstract—EP 1 103 927 A2 May 30, 2001 Mannesmann VDO AG.

Derwent Abstract—EP 1 037 161 A2 Sep. 20, 2000 Mannesmann VDO AG.

* cited by examiner

PRINTER

BACKGROUND OF THE INVENTION

The invention relates to a printer with an elongate media output port, in particular for a digital tachograph of a motor vehicle, with at least one bearing surface which delimits the media output port in the transverse direction and along which the printing medium slides during output. In addition, a printing method for a printer of the abovementioned type is the subject of the invention.

Printers of the abovementioned type are, in particular, small-format appliances, such as are provided, for example, at check-out workstations or in automatic banking machines for the printing of receipts. The media stock is in this case usually wound up on a roll, and printed portions can be separated from the media stock by means of a tear-off edge.

Requirements unknown hitherto confront development in the use of a printer in the future generation of tachographs, the digital tachograph, in which a chip card is employed, instead of the chart used hitherto, for recording the data specific to the driver's workstation. One possibility for outputting the recorded data is to print out the relevant data onto a paper strip by means of a built-in printer. According to the hazardous substance regulations/roads (GGVS), an appliance built into the vehicle in this way must conform to protection class IP 54, and the printer and also its media output port must correspondingly be splashproof under specific conditions.

SUMMARY OF THE INVENTION

The object of the invention is, accordingly, to seal off the media output port of a printer in such a way that the printing medium can nevertheless be outputted from the output port.

To achieve the object according to the invention, a printer of the type initially mentioned, which has the characterizing features of claim 1, is proposed. The dependent subclaims describe expedient developments of the invention.

A decisive advantage of the arrangement according to the invention is based on the fact that the sealing feed guide bears elastically against the bearing surface, thus resulting in an always reliable leaktightness with respect, for example, to splashwater or to similar harmful media. A corresponding dimensioning of the modulus of elasticity as a function of the geometry of the sealing closure ensures that, between the sealing feed guide and the bearing surface, there is a defined surface pressure which prevents the penetration of the harmful media and at the same time allows the output of the printing medium. In this case, bearing contact between the bearing surface and the sealing feed guide in the output direction is of only a slight extent, thus resulting in essentially linear bearing contact in the longitudinal direction of the media output port. The sealing feed guide, which is designed correspondingly as a narrow edge and presses elastically against the bearing surface of the media output port in a sealingly closing manner, can achieve a maximum surface pressure on the bearing surface, in spite of an only slight force which clears the way for the medium to be outputted to pass the seal, and can thus ensure sufficient leaktightness. It is thereby possible for the sealing closure to be of a passive design, that is to say the pressure of the medium to be outputted is sufficient to overcome the frictional forces of the medium opposite to the output direction, these being generated by the sealing closure. There is no need for an active movement of the sealing closure, for example electromotively. A design of the sealing closure is particularly advantageous which makes it possible that the medium to be outputted can be pressed through the gap occurring between the sealing closure and the bearing surface, without printing medium initially being located in this gap.

According to a particularly advantageous development of the invention, the sealing closure is designed as an elastic seal with an elastic sealing lip which presses elastically against the bearing surface. The sealing lip advantageously adapts to unevennesses of the corresponding bearing surface, so that an extremely good planeness of the bearing surface is not necessary for leaktightness.

Advantageously, the seal may have an at least partially sickle-shaped cross-sectional profile, the convex side of the cross-sectional profile pointing opposite to the output direction of the printing medium. A design of this type has the effect that pressure applied from outside intensifies the bearing force of the elastic sealing lip against the bearing surface, if appropriate, only locally, thus ensuring reliable leaktightness.

Another variant of an arrangement according to the invention provides a seal which is designed as a hollow profile and which has a cavity-surrounding wall in circular form or in elliptic form or in oval form. The gap occurring between the bearing surface and the corresponding sealing feed guide in this design is configured so as to narrow in such a way that, even if crease resistance is low, medium to be outputted, as it were trapped in the wedge-shaped profile, can easily displace the seal during output. Expediently, a hollow profile seal of this type is mounted on a shaft of circular cross section, the shaft which extends through the cavity of the hollow profile having a smaller cross section than the cavity has a clear width, so that the hollow profile has a deformation region which is suitable for the output of the medium.

An especially critical region of the seal is located at the two ends which delimit the longitudinal extent and where, with the seal being designed as a sickle-shaped cross-sectional profile, a transverse end web may advantageously be provided in each case in the concave hollow surface. This transverse end web acts in the same way as a baffle wall for the harmful medium which exerts action, so that the flow is conducted away from the end of the seal. This design gives rise to particularly good leaktightness when the plane described by the respective transverse end web is arranged obliquely to the transverse direction, so that the transverse end web forms an angle of between 30° and 85°, in particular 60°, with a longitudinal axis of the seal running in the longitudinal direction. It was possible to establish the lowest possible rates of penetration of the harmful medium at about 60°.

The oblique position described above may expediently be such that the distance between the transverse end webs located opposite one another at the two ends increases toward the sealing feed guide. Particularly, when the sealing closure is arranged with the sealing lip pointing downward, the transverse end webs set obliquely in this way cause the medium which exerts action to flow out at only the lowest possible leakage rate.

In order to impart the required stability to the intrinsically somewhat dimensionally unstable seal having a sickle-shaped cross-sectional profile, in particular in order to prevent the latter from rolling up or being upturned, it is appropriate to arrange between the middle with respect to the longitudinal direction and the respective transverse end web, on both sides, at least one further transverse web in the concave hollow surface, said further transverse web having an identical oblique position and, in particular, running parallel to the transverse end web. Both these transverse webs and the transverse end webs can steer the flow of a harmful medium which exerts action into a desired outflow direction, particularly when they have in the region of their extent, in the transverse direction, a complete and leaktight tie-up to the concave hollow surface along the latter.

In particular, the mounting operation is made significantly easier when the seal consists of two components which have a different hardness, the softer component being arranged in the region of the sealing feed guide, and the harder component being arranged essentially in a region of fastening of the seal. On the one hand, the assembly personnel can more easily handle such a component which has some dimensional stability and, on the other hand, the risk of incorrect mountings and damage is reduced considerably.

The seal, in the region located opposite the bearing surface, may advantageously be fastened to a boundary of the paper output port. In this case, the seal may be guided by means of centering projections, said seal expediently being provided with recesses in a fastening region located opposite the sealing feed guide in the transverse direction, the centering projections being arranged in the recesses. For exactly positioned centering, the recesses expediently have, for the centering projections, fitting surfaces which are formed by a layer of the softer component on the harder component. Coating the harder seal component with the softer seal component in the bearing region of the recesses on the centering projections allows a press fit with less exact tolerances and nevertheless a positional accuracy which is as far as possible identical. Expediently, the seal is held by a fastening component in a position predetermined by the centering and is thus fastened.

Instead of being designed as an elastic sealing lip, the sealing closure may also be designed as a resilient sealing closure with a leaf spring portion which is designed as a leaf spring and which has adjoining it a closing portion having an essentially rigid bearing edge which bears against the bearing surface by means of a sealing feed guide, the leaf spring portion prestressing the closing portion elastically against the bearing surface. As compared with the solution described above, with an elastic sealing lip, the essentially rigid bearing edge, which may advantageously consist of metal or plastic, has the benefit of a longer service life on account of the lower abrasion.

Particularly in the case of a bearing surface consisting of injection-molded plastic, there arise between the rigid bearing edge of usually good planeness and the bearing surface, which can be produced with a comparable planeness only at a high outlay in terms of cost, gaps of a few hundredths of a millimeter which can expediently be compensated when the bearing surface is provided with a soft covering. Felt proves to be preferred material for the soft covering in terms of the coefficients of friction and flexibility. For a suitable positive guidance of the printing medium which is usually paper, the seal may have in continuation, opposite to the output direction, a sliding surface which adjoins the bearing edge and which forms an acute angle with the bearing surface on the sealing feed guide. Particularly in the region of the ends of the seal which delimit the longitudinal extent, it is expedient if the seal is designed to be somewhat longer than the output port, thus resulting, between the walls forming the output port and the seal, in a narrow sealing gap with the effect of a labyrinth seal. This gap may additionally be provided with projections or baffle walls.

In order to increase the leaktightness of the closure according to the invention of a media output port of a printer, in particular during the standstill times of the printer, it is expedient if a control unit controls the media feed out of a media stock and is designed in such a way that, in a first step of a printing operation, printing medium from the media stock is transported in the output direction on the far side of the seal, in a second step printed printing medium is separated from the media stock, and, in a third step, the remaining medium connected to the media stock is transported back opposite to the output direction until there is no longer any medium located between the bearing surface and the sealing feed guide. Such a control of the feed, above all, prevents the ingress of harmful media through gaps between the printing medium located in the region of the bearing surface and the bearing surface or the sealing feed guide. In addition, diffusion, opposite to the output direction, through the printing medium is prevented. The feed of the printing medium may be designed in such a way that, after the separation of the printed part, the printing medium is transported opposite to the output direction by a specific amount by means of a stepping motor, so that there is no longer any printing medium located in the region of the sealing feed guide between the seal and the bearing surface. Alternatively, a corresponding sensor of the control unit may give feedback as to whether printing medium is located in the region of the sealing feed guide or not.

The invention is explained in more detail below, for illustration, by means of exemplary embodiments, with reference to drawings. In addition to the possibilities shown, other refinements of an inventive nature may be gathered by a person skilled in the art.

DETAILED DESCRIPTION OF THE INVENTION

Figure 1:
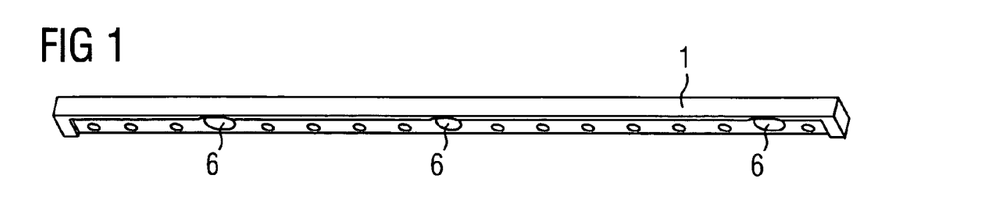
FIG. 1 to FIG. 4: show in each case a perspective view of components of a seal according to the invention.
Figure 2:
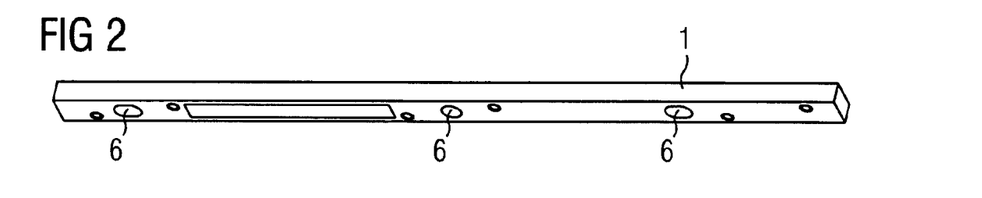

FIGS. 1 and 2 show respectively, in perspective, a front view and a rear view of a hard component 1 of a sealing closure 2 according to the invention.

Figure 3:
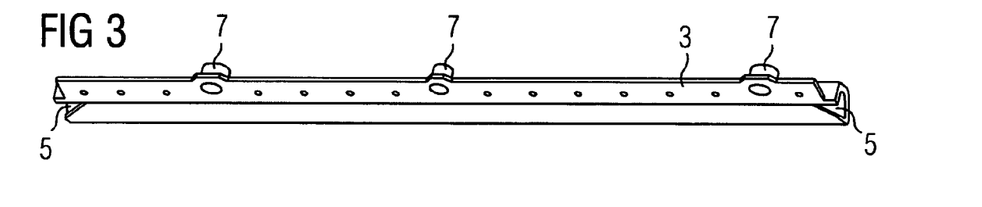
Figure 4:
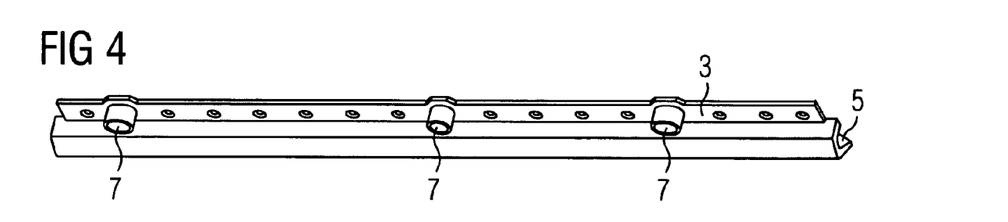
Figure 5:
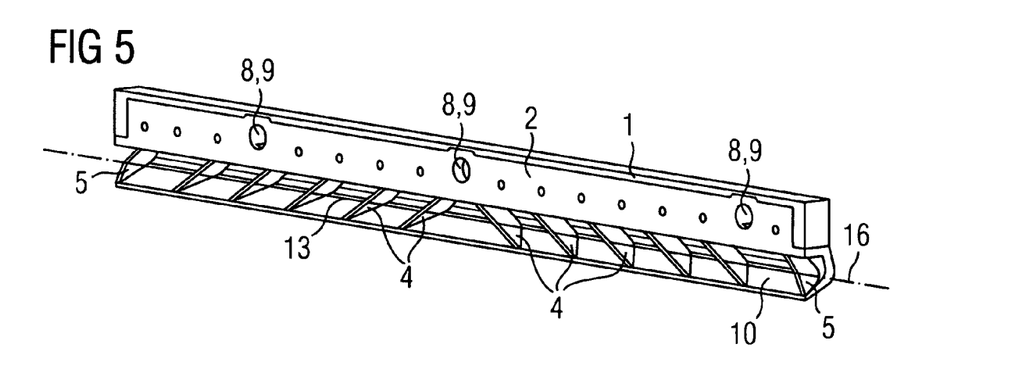
FIG. 5: shows a perspective illustration of a complete seal according to the invention.
Figure 7:
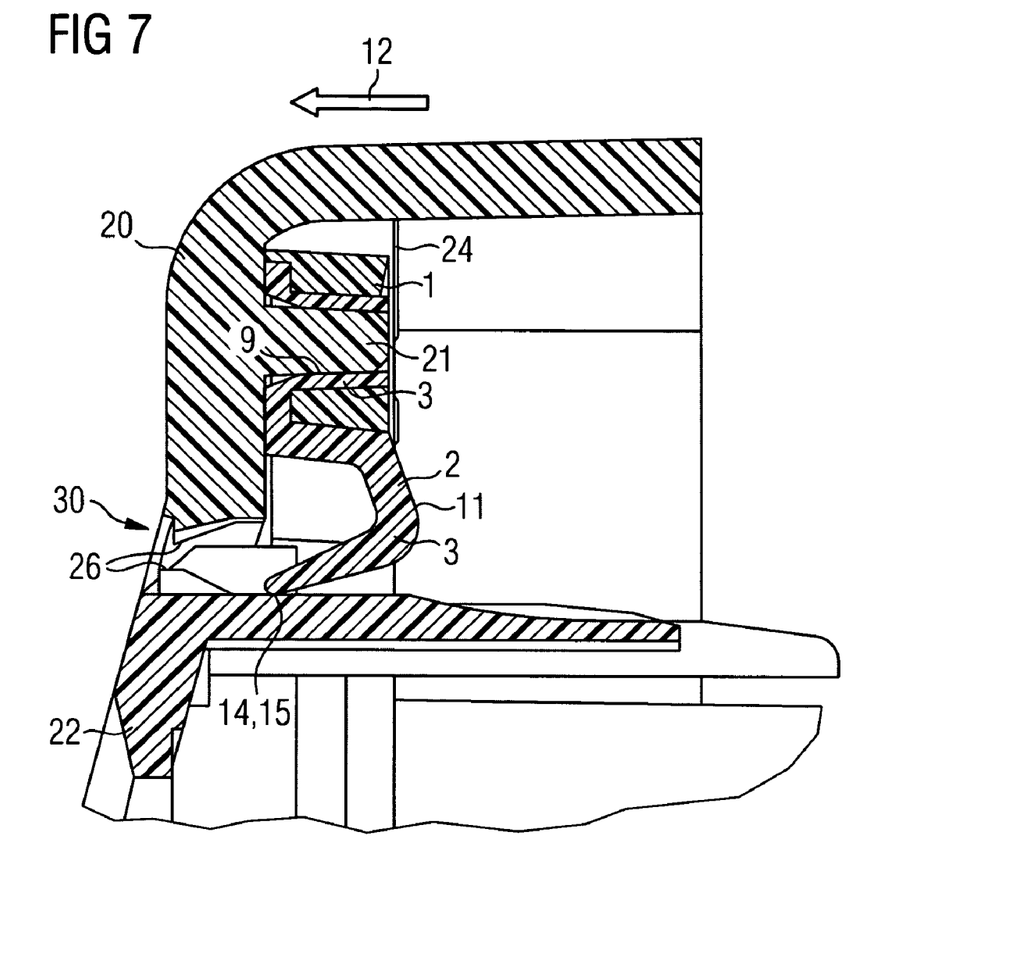
FIG. 7: shows a sectional illustration of a seal according to the invention in the built-in state.

FIGS. 3 and 4 show respectively, in perspective, a front view and a rear view of a softer component 3, and FIG. 5 illustrates an assembly of a sealing closure 2 consisting of the two different components 1, 3, the softer component 3 having a multiplicity of transverse webs 4 in addition to two transverse end webs 5, in contrast to the illustration of FIG. 3. The harder component 1 of the sealing closure 2 is provided with recesses 6 which serve for receiving centering projections, not illustrated, the softer component 3 being provided, for each recess 6, with a centrically hollow shaped-out portion 7 which can be inserted with an exact fit into the recess 6 of the harder component 1 and which thereby forms a layer 8 of the softer component 3 on the harder component 1 and, at the same time, a fitting surface 9 for the centering projections, not illustrated. The sealing closure 2 has a sickle-shaped sealing lip 10, the convex side 11 of which points opposite to the output direction 12 in the built-in state, as illustrated in FIG. 7. The opposite concave hollow surface 13 points in the output direction 12 and, for safety against rolling up or upturning under action by forces from a printing medium (91) or from harmful media exerting action from outside, is reinforced by means of the transverse webs 4 and the transverse end webs 5 which, over the scope of their transverse extent, have a complete and leaktight tie-up to the concave hollow surface 13. As illustrated in FIG. 7, the sealing closure 2 bears, elastically prestressed, on a bearing surface 15 by means of a sealing feed guide 14. Both the transverse end webs 5 and the transverse webs 4 have, in their extent away from the sealing feed guide 14, an oblique position in relation to the middle with respect to the longitudinal extent of the seal. In this case, the transverse end webs 5 are set in relation to a longitudinal axis 16 of the sealing closure 2 at an angle of about 65°, and the transverse webs 4 at an angle of about 55°. This arrangement is designed mirror-symmetrically with respect to a plane running through the middle of the longitudinal extent.

Figure 6:
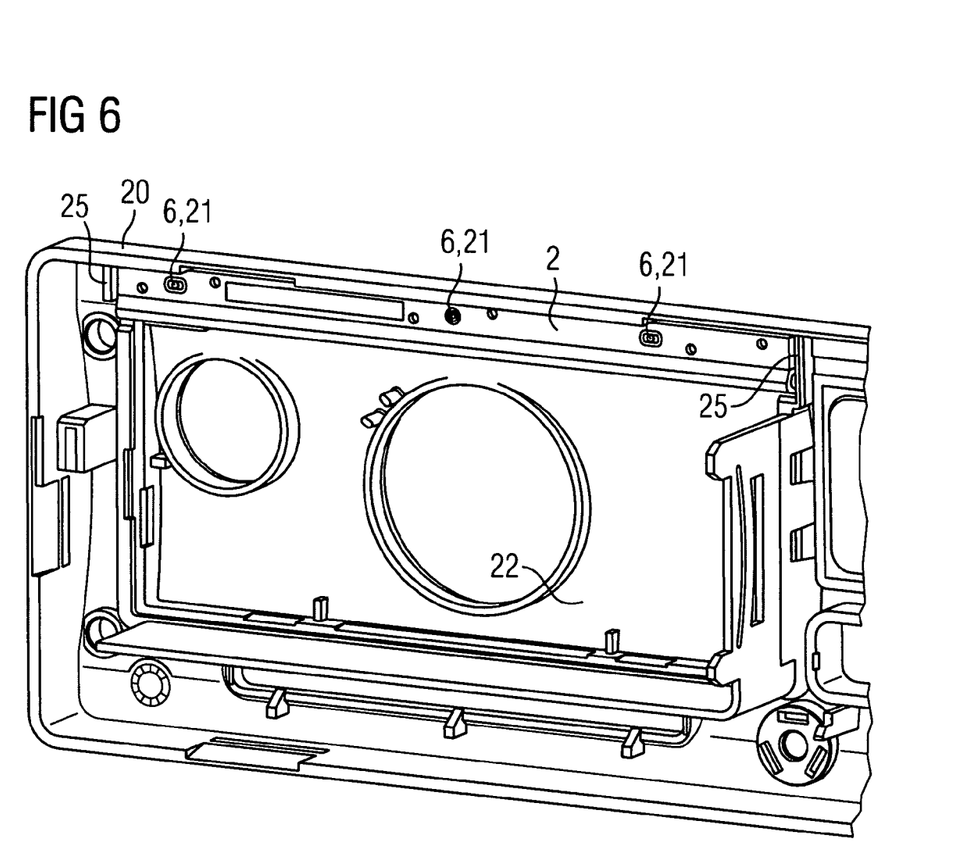
FIG. 6: shows a perspective illustration of a front surround with a mounted seal according to the invention, in a view from the rear.

FIG. 6 shows the sealing closure 2 according to FIG. 5 in assembly with a front surround 20 of a digital tachograph in a perspective view from the rear. The recesses 6 are in this case in engagement with centering projections 21, and the seal bears, in a way illustrated in FIG. 7, against a drawer surround 22 which is inserted in the front surround 20 and which is an integral part of a drawer for the printing apparatus, including a space for a roll-shaped media stock of printing medium 91. At the ends of the sealing closure 2, the front surround 20 is provided in each case with a partition 25 which extends inward perpendicularly with respect to the front surround 20 and which is intended to prevent the lateral penetration of harmful media. The sectional illustration of FIG. 7 shows, in one assembly, the front surround 20, which is produced in one piece with the centering projections 21, and the sealing closure 2 with the softer component 3 and the harder component 1 and the sealing lip 10 in cooperation with the bearing surface 15 in the region of the sealing feed guide 14, said bearing surface being an integral part of the drawer surround 22. Moreover, behind the sealing lip 10 in the output direction 12 is located, in each case at the top and bottom, a tear-off edge 26 for the printed printing medium, not illustrated. The printing medium 91 slides along the inward prolongation of the bearing surface 15 into the region of the sealing feed guide 14, past the sealing lip 10, with the sealing closure 2 being deformed elastically, and out of a media output port 30 in the output direction 12. The sealing closure 2 is held in a fastening region 31 on the front surround 20 by means of fastening components 32, the sealing closure 2 being positioned by means of the centering projections 21, at the same time bearing against the fitting surfaces 9 which are coated with the softer component 3.

Figure 8:
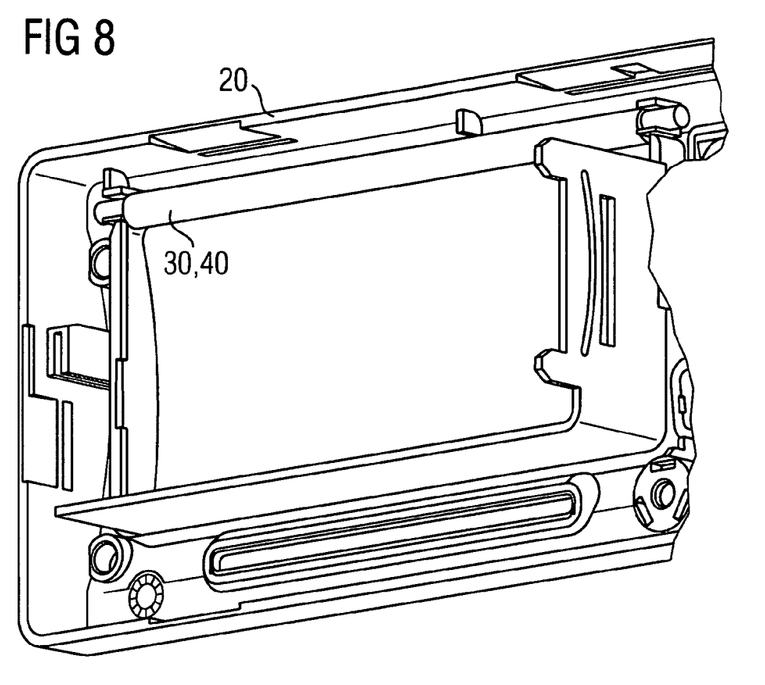
FIG. 8: shows a perspective illustration of a seal according to the invention built into a front surround, in a view from the rear.
Figure 9:
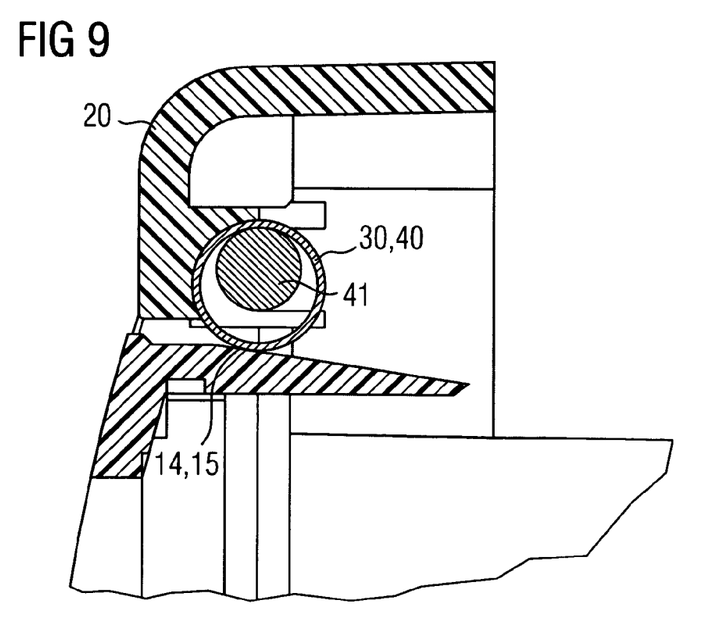
FIG. 9: shows a sectional illustration through a seal according to the invention in the built-in state.

Another possibility for designing a sealing closure 2 according to the invention is shown in FIG. 8 and FIG. 9, where the sealing closure 2 is designed as a flexible hose 40 of essentially circular cross section. In an arrangement which is otherwise essentially identical to the above-described design of the arrangement according to the invention, the fastening of the sealing closure 2 designed as a hose 40 takes place by means of a shaft 41 which extends in the longitudinal direction of the sealing closure 2 in a cavity formed by the hose 40 and which likewise has a circular cross section, the selected diameter of the shaft 41 being lower by an amount which corresponds essentially to a deformation corresponding to the output of the printing medium.

Figure 10:
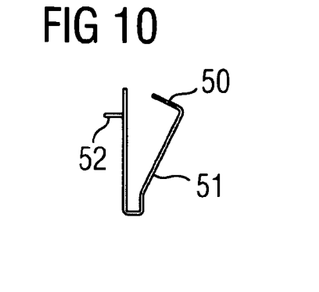
FIG. 10 to FIG. 12: show in each case an illustration of a seal according to the invention with a leaf spring portion in three different views.
Figure 11:
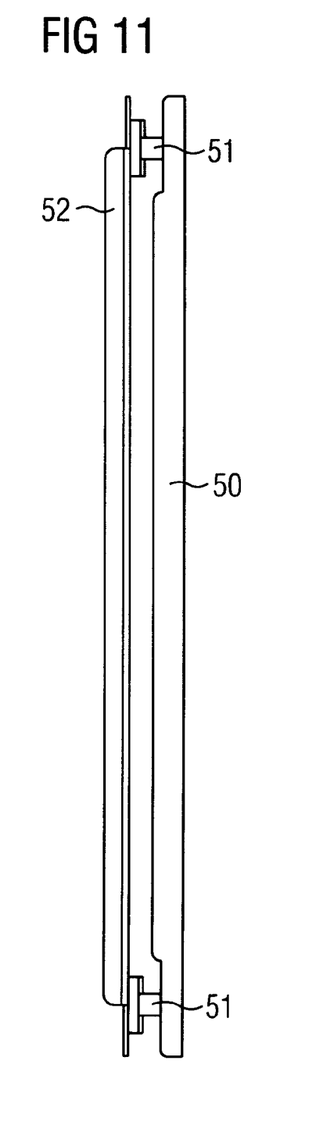
Figure 12:
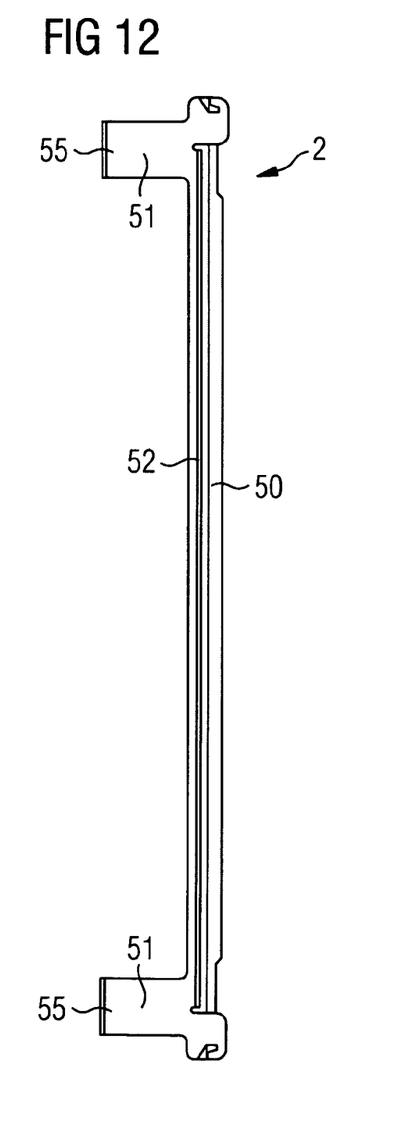
Figure 13:
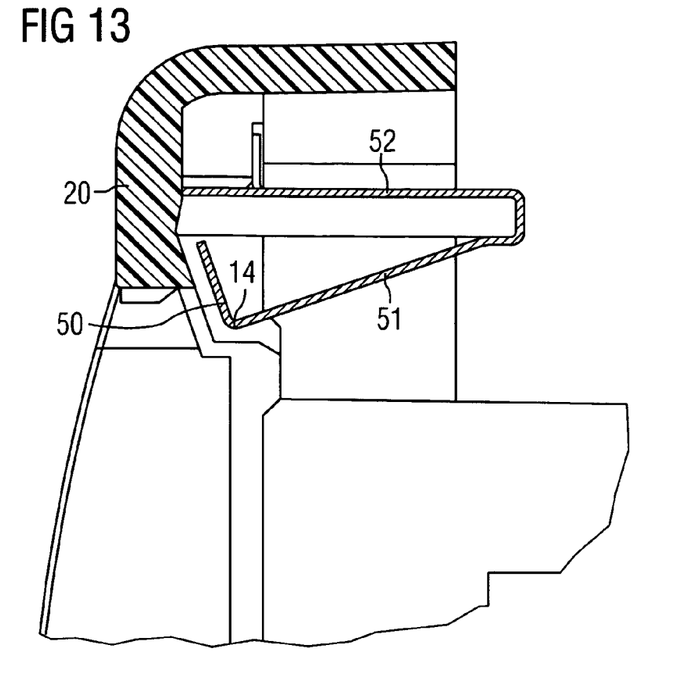
FIGS. 13 and 14: show in each case a sectional illustration through a seal according to the invention with a leaf spring portion in the built-in state, on the one hand with a bearing surface and on the other hand without a bearing surface.
Figure 14:
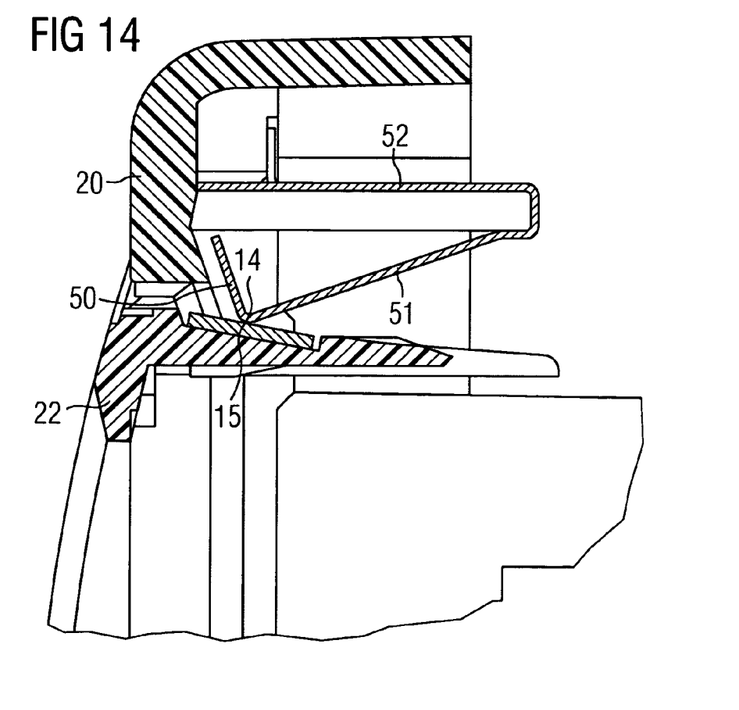

FIGS. 10 to 12 show a third possibility for designing a sealing closure 2 according to the invention, the arrangement having a leaf spring portion 51, a closing portion 50 and a fastening portion 52. The sealing closure 2 is produced in one piece as a bent metal stamping. The closing portion 50 is bent in an L-shaped manner, the outer edge of the bend being designed as a sealing feed guide 14 for bearing against a bearing surface 15 according to the illustrations in FIGS. 13 and 14. The leaf spring portion 51 is divided essentially into two leaf springs 55 which are arranged at the ends with respect to the longitudinal direction of the sealing closure 2 and which, taking into account the rigidity of the closing portion, ensure a uniform bearing force of the sealing feed guide 14 against the bearing surface 15 along the longitudinal extent. The bearing surface 15 on the drawer surround 22 is provided with a soft covering 56, to be precise a felt 57, which prevents the formation of a gap between the sealing feed guide 14 and the bearing surface 15 of the drawer leaves 22 which is produced as an injection-molded component without special tolerances.

Figure 15:
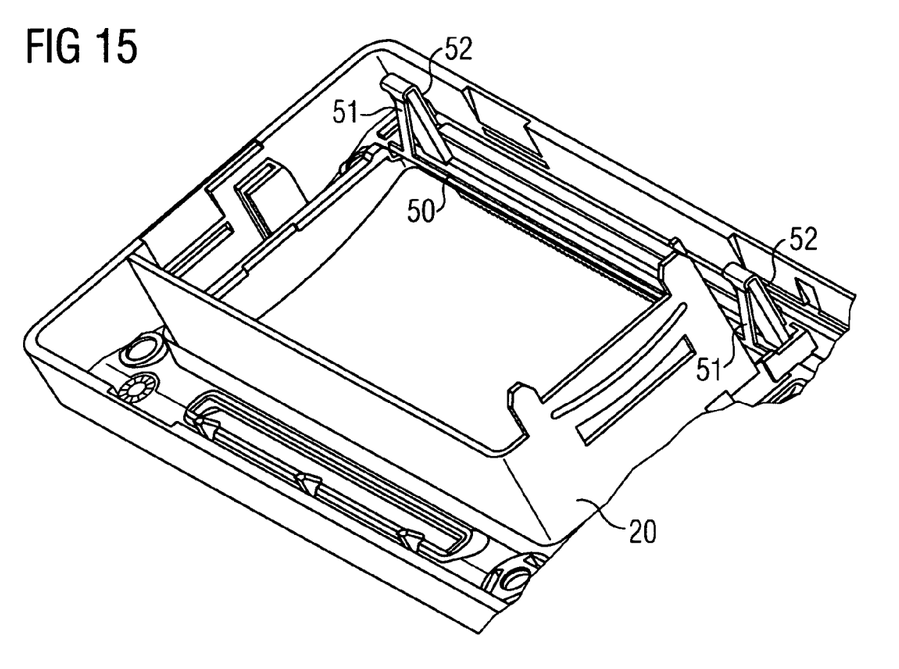
FIG. 15: shows a perspective illustration of a front surround with a built-in seal which has a leaf spring portion, in a perspective view from the rear.
Figure 16:
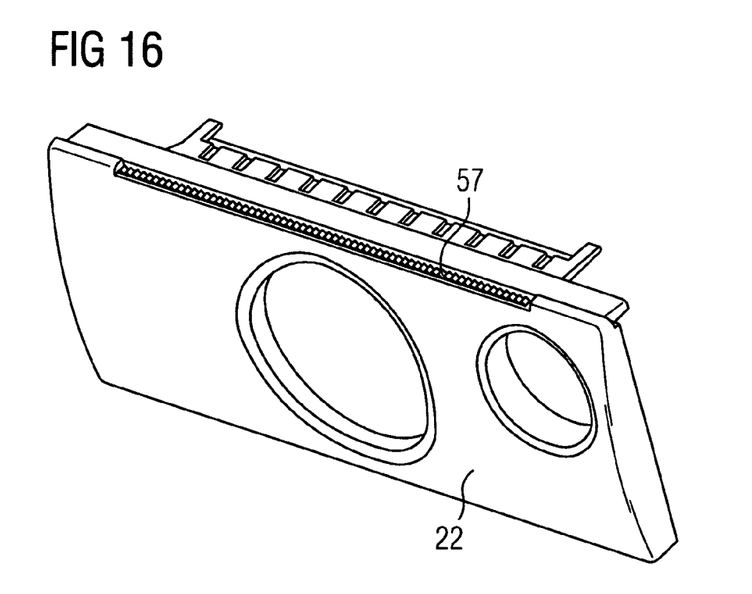
FIG. 16: shows a perspective illustration of a bearing surface provided on a drawer-type surround and having a glued-on felt strip, in a view from the front.

A perspective illustration of the built-in situation is shown in FIG. 15, in which partitions 25 are likewise provided on the front surround 20 at the lateral ends of the sealing closure 2 in a similar way to the arrangement of FIG. 6. The leaf spring portions 51 continuing in the L-shape of the closing portion 50 serve as an additional guide for a printing medium 91, not illustrated.

Figure 17A:
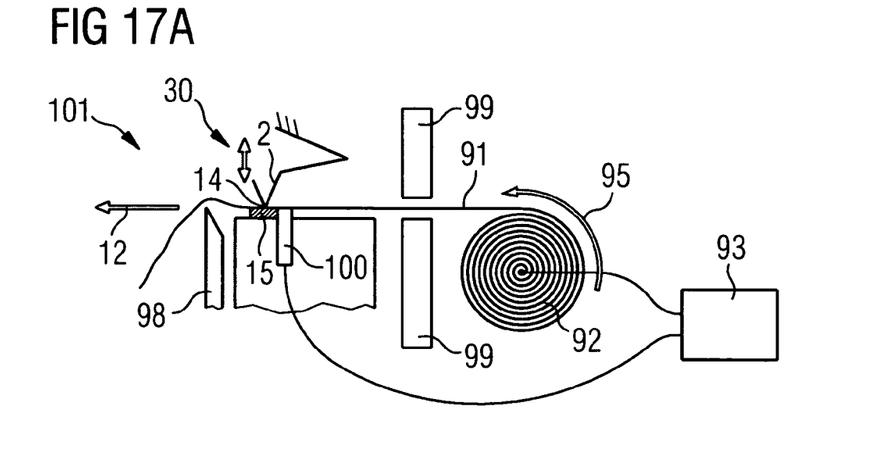
FIG. 17: shows a diagrammatic illustration of the printing method according to the invention in three steps.
Figure 17B:
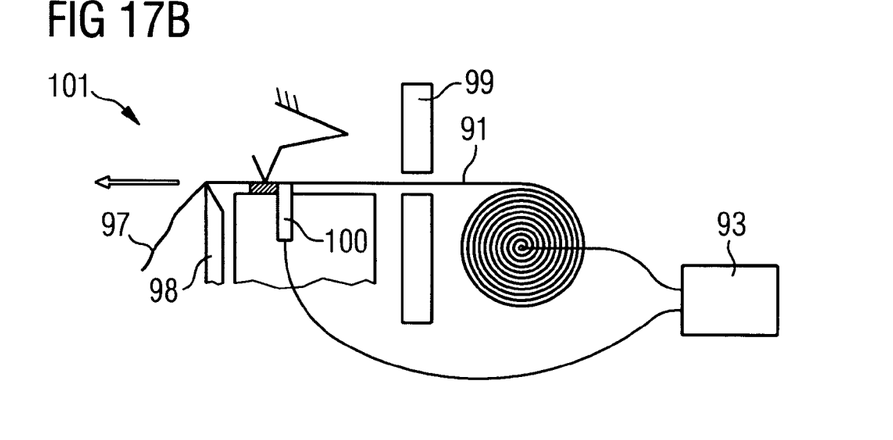
Figure 17C:
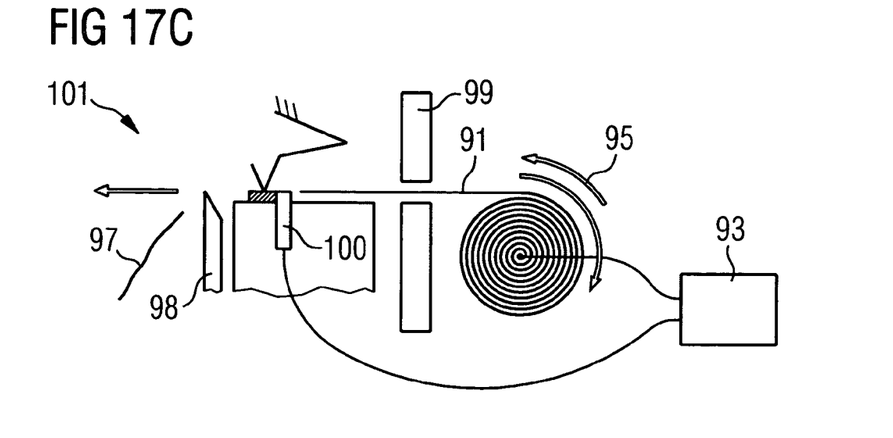

The printing method according to the invention, illustrated diagrammatically in FIG. 17 with three steps a, b, c, is carried out by means of a control unit 93, a media stock 92 which consists of a roll of rolled-up printing medium 91, a printing unit 99, a bearing surface 15, a tear-off edge 98 and an arrangement, already explained above, composed of a sealing closure 2 with a sealing feed guide 14. In a first step, the media stock 92 rotates counterclockwise in a drive direction 95, so that printing medium 91 printed by the printing unit 99 is transported out of the media output port 30 between the sealing closure 2 along a bearing surface 15 in the output direction 12. When a predetermined printed portion 97 is conveyed on the far side of the tear-off edge 98 located behind the media output port 30 in the output direction 12, the printed portion 97 is separated from the rest of the media stock 92. The control unit 93 subsequently controls the drive, not illustrated, of the media stock 92 clockwise opposite to the drive direction 95, so that the printing medium 91 remaining on the media stock 92 moves opposite to the output direction 12 as long as a sensor 100 detects that that end of the printing medium 91 which is produced by the tear-off edge is in front of the sealing closure 2 in the output direction 12 and communicates this to the controller 93 which stops the drive, not illustrated, of the media stock 92.

The invention claimed is:

1. A printer for a digital tachograph for a motor vehicle, the printer comprising:

an elongate media output port with at least one bearing surface arranged to delimit the media output port in a transverse direction and along which printing medium slides during output;

wherein the media output port comprises an elongate sealing closure arranged to be movable in the transverse direction and press elastically against the bearing surface by means of a sealing feed guide so as to close the media output port, wherein the printing medium is capable of being outputted between the bearing surface and the sealing closure in an output direction, wherein the sealing closure comprises an elastic seal with an elastic sealing lip which presses elastically against the bearing surface, wherein the elastic seal has an at least partially sickle-shaped cross-sectional profile, a convex side of the cross-sectional profile pointing opposite to the output direction of the printing medium, and wherein the elastic seal has a length limited by a first end and a second end, and, in a region of each end, a transverse end web in a concave hollow surface of the cross-sectional profile.

2. The printer according to claim 1, wherein a plane described by a transverse end web is arranged obliquely to the transverse direction, so that the transverse end web forms an angle of between 30° and 85° with a longitudinal axis of the seal which runs in a longitudinal direction.

3. The printer according to claim 2, wherein distance between the transverse end webs located opposite one another at the two ends increases toward the sealing feed guide.

4. The printer according to claim 1, further comprising at least two transverse webs each arranged in the concave hallow surface between a middle of the seal's length and a respective one of the transverse end webs, each transverse web having an identical oblique position and arranged to run parallel to the respective transverse end web.

5. The printer according to claim 1, wherein the transverse end webs have in the transverse direction, a complete and leaktight tie-up to the concave hollow surface.

6. The hunter according to claim 1, wherein the seal comprises two components having different hardnesses, a softer component being arranged in a region of a sealing feed guide and a harder component being arranged essentially in a region of fastening of the seal.

7. The printer according to claim 6, wherein the seal is fastened to a boundary of the media output port in a region located opposite the bearing surface.

8. The printer according to claim 7, wherein the seal is guided by means of centering projections and the seal is provided with recesses in a fastening region located opposite the sealing feed guide in the transverse direction, the centering projections being arranged in the recesses.

9. The printer according to claim 8, wherein the recesses have fitting surfaces formed by a layer of the softer component on the harder component.

10. The printer according to claim 8, further comprising a fastening component arranged to clamp the seal in the fastening region.

11. A printer for a digital tachograph for a motor vehicle, the printer comprising:

an elongate media output port with at least one bearing surface arranged to delimit the media output port in a transverse direction and along which printing medium slides during output;

wherein the media output port comprises an elongate sealing closure arranged to be movable in the transverse direction and press elastically against the bearing surface by means of a sealing feed guide so as to close the media output port, wherein the printing medium is capable of being outputted between the bearing surface and the sealing closure in an output direction, wherein the sealing closure comprises an elastic seal with an elastic sealing lip which presses elastically against the bearing surface, wherein the seal comprises two components having different hardnesses, a softer component being arranged in a region of the sealing feed guide and a harder component being arranged essentially in a region of fastening of the seal, wherein the seal is fastened to a boundary of the media output port in a region located opposite the bearing surface, wherein the seal is guided by means of centering projections and the seal is provided with recesses in the fastening region located opposite the sealing feed guide in the transverse direction, the centering projections being arranged in the recesses, and wherein the recesses have fitting surfaces formed by a layer of the softer component on the harder component.

12. The printer according to claim 11, wherein the seal has an at least partially sickle-shaped cross-sectional profile, a convex side of the cross-sectional profile pointing opposite to the output direction of the printing medium.

13. The printer according to claim 11, wherein the seal comprises a hollow profile and a cavity-surrounding wall having at least one of a circular form, an elliptic form and an oval form.

14. The printer according to claim 13, wherein the seal has a length limited by a first end and a second end, and, in a region of each end, a transverse end web in a concave hollow surface of the cross-sectional profile.

15. The printer according to claim 14, wherein a plane described by a transverse end web is arranged obliquely to the transverse direction, so that the transverse end web forms an angle of between 30° and 85° with a longitudinal axis of the seal which runs in a longitudinal direction.

16. The printer according to claim 15, wherein a distance between the transverse end webs located opposite one another at the two ends increases toward the seating feed guide.

17. The printer according to claim 11, further comprising at least two transverse webs, each arranged in the concave hollow surface between a middle of the seal's length and a respective transverse end web, each transverse web having an identical oblique position and arranged to run parallel to the transverse end web.

18. The printer according to claim 11, wherein the transverse end webs have in the transverse direction, a complete and leaktight tie-up to the concave hollow surface.

19. The printer according to claim 11, further comprising a fastening component arranged to clamp the seal in the fastening region.

* * * * *